UNITED STATES PATENT OFFICE.

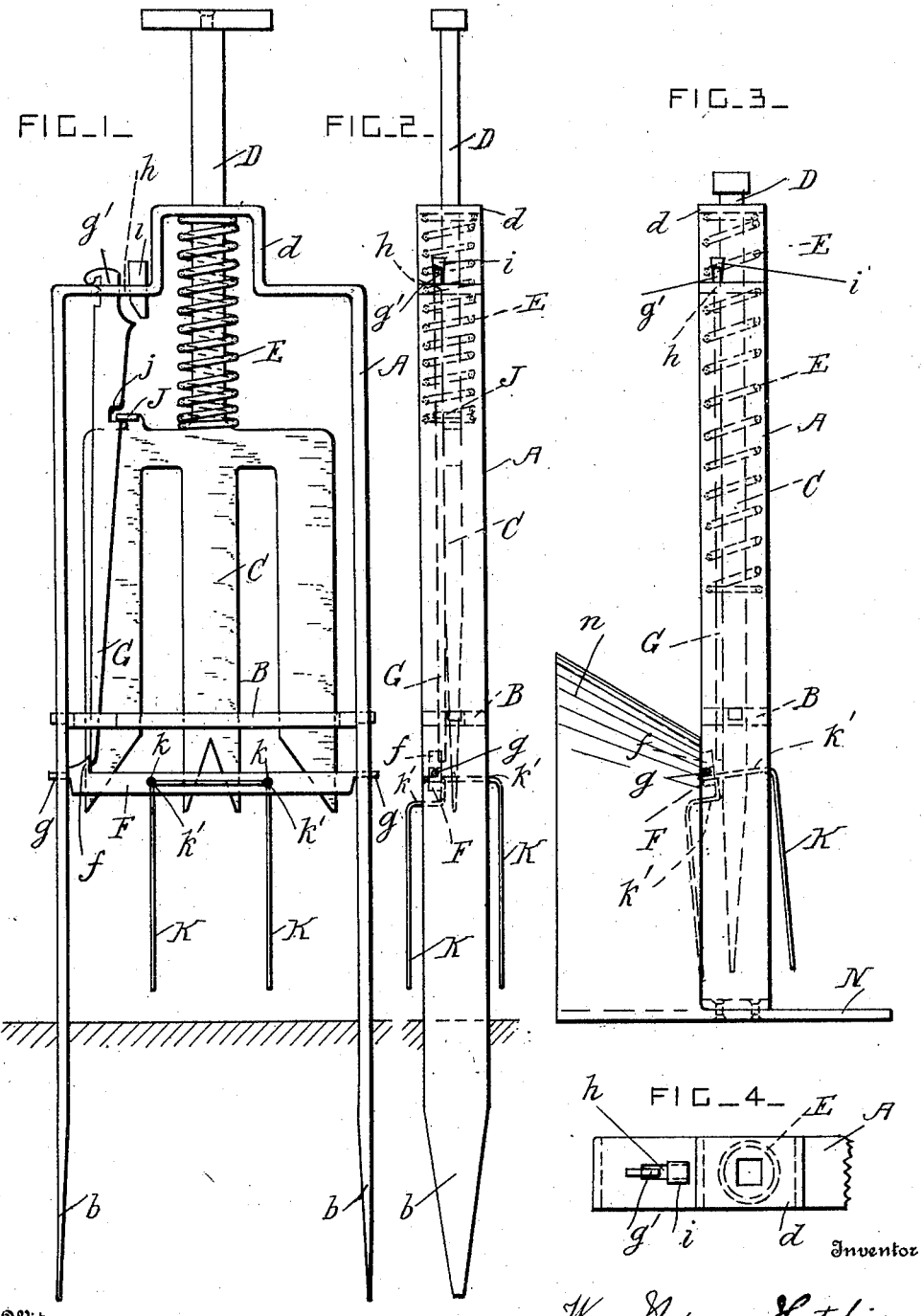

WILLIAM NEPEAN-HUTCHISON, OF VICTORIA, BRITISH COLUMBIA, CANADA.

ANIMAL-TRAP.

964,877. Specification of Letters Patent. Patented July 19, 1910.

Application filed June 26, 1909. Serial No. 504,491.

*To all whom it may concern:*

Be it known that I, WILLIAM NEPEAN-HUTCHISON, a subject of the King of Great Britain and Ireland, residing at Victoria, British Columbia, Canada, have invented certain new and useful Improvements in Animal-Traps; and I do hereby declare the following to be a full, clear, and exact description of the invention, such as will enable others skilled in the art to which it appertains to make and use the same.

This invention relates to traps for destroying small animals, such as rats, gophers and moles; and it consists in the novel construction and combination of the parts hereinafter fully described and claimed.

In the drawings, Figure 1 is a front view of the trap. Fig. 2 is a side view of the same. Fig. 3 is a side view of the trap showing a modification, and also showing the trap unset. Fig. 4 is a detail plan view of the catch and a portion of the frame.

A is a supporting frame. In the form of the trap shown in Figs. 1 and 2, this frame is provided with prongs $b$ which are driven into the ground, but the frame may be supported in position in any other approved manner.

B is a guide which extends across the middle part of the frame.

C is a blade which is slidable in the guide B, and which is provided with a shank D which is slidable in a hole in the crosspiece $d$ which forms the top part of the frame A.

E is a spring which encircles the shank D and which extends between the upper end of the blade and the crosspiece $d$, and which forces the blade downward. The blade is preferably provided with a series of sharp prongs for killing the animal.

F is a trigger-bar which is pivoted in the frame A to one side of the path of the blade. This trigger-bar is provided with a tooth $f$ on its upper side, and its pivots $g$ are arranged eccentric of its main portion so that the tooth $f$ is normally held in a vertical position automatically.

G is a catch the upper end portion of which is provided with a neck $g'$ which is narrower than the adjacent parts of the catch.

The crosspiece $d$ of the frame is provided with a slot or hole $h$, and the neck $g'$ is held in loose pivotal engagement with this hole by means of a wedge $i$ or any other approved retaining device. The wedge $i$ is driven into one end portion of the hole after the neck $g'$ has been placed in position. The middle part of the catch G is provided with a notch $j$ which engages with a lug J on the upper part of the blade C. The lower part of the catch is guided by the guide B, and when the trap is set the downward pressure of the spring E presses the lower end portion of the catch against the tooth $f$.

K is an operating wire, or wires, formed of copper. This wire is passed through holes $k$ in the trigger-bar F, and its end portions are arranged in the space between the lower parts of the frame. The end portions of the wire have horizontal parts $k'$ which extend in opposite directions and which support its vertical portions respectively in front of and to the rear of the frame and blade, so that the action of the trap is rendered more certain and efficient. Copper wire is preferred as it is very flexible and can be bent in any direction so that its end portions can be arranged and cranked to come in any desired position with respect to the blade C.

When the animal presses against the end portions of the operating wire K in an attempt to pass under the blade, the trigger-bar is turned on its pivots so that the catch is released from the tooth. When the catch slips past the tooth it releases the blade, and the blade is forced downward by its spring so that it impales the animal.

The various parts of the trap are all loosely connected, and the construction is such that it is not easily spoiled by rust or by exposure to the weather, or by rough handling.

In the modification shown in Fig. 3, the prongs $b$ are dispensed with, and the frame A is secured to a base-plate N which rests on the ground. This base-plate has a guide-funnel $n$ at one end, and this form of the trap is adapted to be stood in front of a rat-hole with the guide-funnel over the hole so that the rat must pass under the blade on leaving or entering its hole.

What I claim is:

In an animal trap, the combination, with a base-plate having at one end portion a funnel-shaped guide for the animal, the bottom of the guide being flat and formed by the said base-plate and the top of the guide being arch-shaped and inclined downwardly toward the middle part of the base-plate;

of a trap frame secured in a vertical position to the middle part of the base-plate against the smaller end of the said guide, a spring-actuated blade slidable in the said frame, and a trigger-bar provided with an operating-catch and normally supporting the said blade.

In testimony whereof I affix my signature, in presence of two witnesses.

WILLIAM NEPEAN-HUTCHISON.

Witnesses:
ROBERT M. NEWCOMB,
WILLARD G. BECKTELL.